United States Patent [19]

Doi et al.

[11] Patent Number: 5,580,928
[45] Date of Patent: Dec. 3, 1996

[54] RESIN COMPOSITION

[75] Inventors: Toru Doi; Hiroshi Inoue, both of Yokkaichi, Japan

[73] Assignee: Tosoh Corporation, Japan

[21] Appl. No.: 559,144

[22] Filed: Nov. 17, 1995

[30] Foreign Application Priority Data

Nov. 30, 1994 [JP] Japan .................................. 6-296612

[51] Int. Cl.⁶ .............................. C08L 25/12; C08L 35/00
[52] U.S. Cl. ........................................ 525/205; 525/207
[58] Field of Search ..................................... 525/205, 207

[56] References Cited

U.S. PATENT DOCUMENTS

| | | | |
|---|---|---|---|
| 3,651,171 | 3/1972 | Von Bonin | 260/857 G |
| 4,374,951 | 2/1983 | Lee | 525/73 |
| 4,424,254 | 1/1984 | Hedrick | 428/215 |
| 4,605,700 | 8/1986 | Le-Khac | 525/73 |

OTHER PUBLICATIONS

Flory, P. J., "Principles of Polymer Chemistry," Cornell Univ. Pr., Ithaca, pp. 310, 312 1953.
"Chain Orientation and Intrinsic Anisotropy in Birefringence–free Polymer Blends", Hiromu Saito et al, Journal of Polymer Science: Part B: Polymer Physics, vol. 25, pp. 1629–1636 (1987).
"Compensation method for zero birefringence in oriented polyers", Berned R. Hahn et al, Polymer, 1985, vol. 26, Oct., pp. 1619–1622

Primary Examiner—Vasu S. Jagannathan
Attorney, Agent, or Firm—Nixon & Vanderhye

[57] ABSTRACT

A resin composition is disclosed which comprises:

(a) from 1 to 99% by weight of a maleimide-olefin copolymer comprising from 40 to 60 mol % of structural unit (I) shown below and from 60 to 40 mol % of structural unit (II) shown below and having a number-average molecular weight of from $1 \times 10^3$ to $5 \times 10^6$:

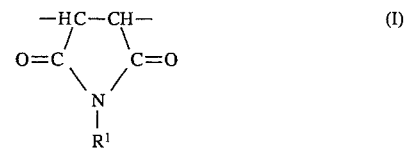

wherein $R^1$ is hydrogen or an alkyl having 1 to 6 carbon atoms,

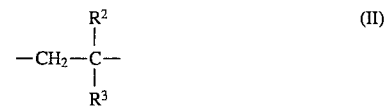

wherein $R^2$ and $R^3$ each is hydrogen or an alkyl having 1 to 6 carbon atoms; and (b) from 99 to 1% by weight of an acrylonitrile-styrene copolymer containing from 21 to 45% by weight of an acrylonitrile units. The composition is excellent in optical properties including transparency and low birefringence and in heat resistance and mechanical properties.

8 Claims, No Drawings

RESIN COMPOSITION

FIELD OF THE INVENTION

The present invention relates to a compatible resin composition which comprises a maleimide-olefin copolymer and an acrylonitrile-styrene copolymer and is excellent in optical properties including transparency and low birefringence and in heat resistance and mechanical properties.

BACKGROUND OF THE INVENTION

Polycarbonates are a transparent plastic with excellent heat resistance, and are used in many applications as automotive parts including headlamp lenses, electrical and electronic parts, medical parts, housing materials, etc. In particular, use of polycarbonates as optical materials, e.g., compact-disk substrates and optical lenses, or automotive windowpane materials for an attractive appearance or weight reduction has come to be investigated recently. However, since polycarbonates have a large wavelength dependence of refractive index and are highly birefringent, uses thereof are often limited especially in optical applications. Automotive windowpanes made of polycarbonates have a severe problem that distortion of vision tends to occur due to their high birefringence. In addition, polycarbonates have many drawbacks including low rigidity, low surface hardness, and hence low marring resistance.

Acrylonitrile-styrene copolymers, which are an inexpensive transparent resin, are used in many fields including electrical appliances, vehicle parts, stationary, and miscellaneous goods. However, since acrylonitrile-styrene copolymers also are highly birefringent and have drawbacks similar to those of polycarbonates, uses thereof as optical parts are limited. In addition, acrylonitrile-styrene copolymers have low heat resistance and are hence unsuitable for use as an automotive windowpane. To improve the heat resistance of acrylonitrile-styrene copolymers, copolymerization with a maleimide compound was investigated. However, the copolymers with a maleimide compound not only are brittle and unsatisfactory in mechanical properties, but have a drawback of having a color. In U.S. Pat. No. 4,374,951 is disclosed a compatible resin composition comprising an acrylonitrile-styrene copolymer and a styrene-phenylmaleimide copolymer. However, this composition also has drawbacks of having a color and being brittle, though the heat resistance of the acrylonitrile-styrene copolymer has been improved. On the other hand, maleimide-olefin copolymers have satisfactory transparency, high heat resistance, and excellent mechanical strength, but a further diminution in birefringence is desired.

SUMMARY OF THE INVENTION

An object of the present invention is to provide a resin composition excellent in optical properties, heat resistance, and mechanical properties.

The present inventors made intensive studies in view of the problems described above. As a result, it has been found that a resin composition which comprises a maleimide-olefin copolymer and an acrylonitrile-styrene copolymer having a specific composition has satisfactory compatibility between the copolymers and has reduced birefringence, and that the above-described object can be accomplished with this composition. The present invention has been completed based on this finding.

The present invention provides a resin composition comprising:

(a) from 1 to 99% by weight of a maleimide-olefin copolymer comprising from 40 to 60 mol % of structural unit (I) shown below and from 60 to 40 mol % of structural unit (II) shown below and having a number-average molecular weight calculated for standard polystyrene of from $1\times10^3$ to $5\times10^6$:

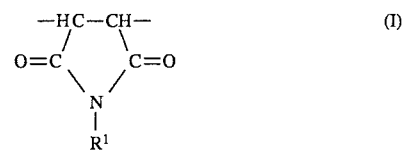

wherein $R^1$ represents a hydrogen atom or an alkyl group having from 1 to 6 carbon atoms,

wherein $R^2$ and $R^3$ each represents a hydrogen atom or an alkyl group having from 1 to 6 carbon atoms; and (b) from 99 to 1% by weight of an acrylonitrile-styrene copolymer containing from 21 to 45% of an acrylonitrile units.

DETAILED DESCRIPTION OF THE INVENTION

The maleimide-olefin copolymer comprising structural unit (I) and structural unit (II) both described above can be obtained, for example, by radical copolymerization of maleimide or a derivative thereof with an olefin. Examples of the compound which gives structural unit (I) include maleimide and derivatives thereof such as N-methylmaleimide, N-ethylmaleimide, N-n-propylmaleimide, N-isopropylmaleimide, N-n-butylmaleimide, N-isobutylmaleimide, N-s-butylmaleimide, N-t-butylmaleimide, N-n-pentylmaleimide, N-n-hexylmaleimide, N-cyclopropylmaleimide, N-cyclobutylmaleimide, and N-cyclohexylmaleimide. Of these, N-methylmaleimide is especially preferred from the standpoints of heat resistance, mechanical properties, and transparency. These compounds may be used either alone or in combination of two or more thereof.

Examples of the compound which gives structural unit (II) include olefins such as isobutene, 2-methyl-1-butene, 2-methyl-1-pentene, and 2-methyl-1-hexene. Of these, isobutene is especially preferred from the standpoints of heat resistance, mechanical properties, and transparency. These compounds may be used either alone or in combination of two or more thereof.

The content of structural unit (I) in the whole copolymer is from 40 to 60 mol %, and is preferably from 45 to 55 mol % from the standpoints of heat resistance and mechanical properties. Unit (I) contents exceeding 60 mol % are undesirable since a brittle composition results, while unit (I) contents lower than 40 mol % are undesirable since a composition having reduced heat resistance results. The content of structural unit (II) in the whole copolymer is from 60 to 40 mol % and preferably from 55 to 45 mol %.

In polymerizing those monomers, a known polymerization method can be employed, such as bulk polymerization, solution polymerization, suspension polymerization, or emulsion polymerization method. From the standpoint of the transparency and color tone of the composition to be obtained, the precipitation polymerization method is especially preferred.

Examples of a usable polymerization initiator include organic peroxides such as benzoyl peroxide, lauryl peroxide, octanoyl peroxide, acetyl peroxide, di-t-butyl peroxide, t-butyl cumyl peroxide, dicumyl peroxide, t-butyl peroxyacetate, and t-butyl peroxybenzoate; and azo initiators such as 2,2'-azobis(2,4-dimethylvaleronitrile), 2,2'-azobis(2-butyronitrile), 2,2'-azobisisobutyronitrile, dimethyl 2,2'-azobisisobutyrate, and 1,1'-azobis(cyclohexane-1-carbonitrile).

Examples of a solvent usable in the solution polymerization method include benzene, cyclohexane, dioxane, tetrahydrofuran, acetone, methyl ethyl ketone, dimethylformamide, isopropyl alcohol, and butyl alcohol. Especially preferably used in precipitation polymerization is a mixed solvent comprising an aromatic compound and an alcohol.

The polymerization temperature may be suitably selected according to the decomposition temperature of the initiator used. In general, however, the polymerization is preferably conducted at a temperature in the range of from 40° to 150° C.

An alternative method for obtaining the maleimide-olefin copolymer is to subject a copolymer of maleic anhydride and an olefin to post-imidization with ammonia, an alkylamine, etc.

This post-imidization for producing the maleimide-olefin copolymer may be accomplished by reacting either a melt of, e.g., a maleic anhydride-isobutene copolymer or a solution or dispersion of the copolymer in an alcohol solvent (e.g., methanol, ethanol, or propanol) or in an aromatic solvent (e.g., benzene or toluene) with a primary amine (e.g., methylamine) at a temperature of 100° to 350° C. The number-average molecular weight ($M_n$) of the thus-yielded copolymer can be determined by gel permeation chromatography (GPC). The molecular weight of the maleimide-olefin copolymer is from $1\times10^3$ to $5\times10^6$, preferably from $1\times10^4$ to $1\times10^6$ especially from the standpoint of a balance between mechanical properties and moldability. Maleimide-olefin copolymers having a molecular weight exceeding $5\times10^6$ tend to give a composition having impaired moldability, while maleimide-olefin copolymers having a molecular weight lower than $1\times10^3$ tend to give a brittle composition.

The acrylonitrile-styrene copolymer used in the present invention preferably has an acrylonitrile content of from 21 to 45% by weight, more preferably from 21 to 30% by weight, based on the amount of the whole copolymer. Acrylonitrile contents outside that range are undesirable in that such an acrylonitrile-styrene copolymer has reduced compatibility with the maleimide-olefin copolymer and, hence, the composition obtained therefrom is opaque and has reduced heat resistance.

Also, the acrylonitrile-styrene copolymer used in the present invention preferably has a number-average molecular weight of from $1\times10^3$ to $1\times10^6$, more preferably from $1\times10^4$ to $1\times10^5$. The number-average molecular weight ($M_n$) of the copolymer can be determined by gel permeation chromatography (GPC). Acrylonitrile-styrene copolymers having a molecular weight exceeding $1\times10^6$ tend to give a composition having impaired moldability, while acrylonitrile-styrene copolymers having a molecular weight lower than $1\times10^3$ tend to give a composition having impaired mechanical properties.

In the composition of the present invention, the proportion of the maleimide-olefin copolymer to the acrylonitrile-styrene copolymer is from 1:99 to 99:1 by weight, and is preferably from 10:90 to 90:10, more preferably from 50:50 to 90:10, by weight, especially from the standpoint of a balance between processability and heat resistance. Proportions of the maleimide-olefin copolymer below 1% by weight are undesirable in that the composition obtained has reduced heat resistance. Proportions of maleimide-olefin copolymer exceeding 99% by weight are undesirable in that the composition obtained should be processed at a higher temperature and this causes thermal deterioration of the acrylonitrile-styrene copolymer. Furthermore, such too low or too high a proportion of the maleimide-olefin copolymer is also undesirable in that the composition obtained has enhanced birefringence.

An explanation is given below on the reduced birefringence of the material of the present invention. Proposed as a material having reduced birefringence is a compatible blend of a polymer having negative birefringence with a polymer having positive birefringence (see *Polymer*, Vol. 26, p. 1619, 1985 and *Kino Zairyo* (Functional Material), March, 1987 issue, p. 21). Acrylonitrile-styrene copolymers and maleimide copolymers are both known as a material having negative birefringence (see *Kino Zairyo*, March 1987 issue, p. 21). Because of the above, the birefringence compensation theory may be regarded as inapplicable to a combination of those two kinds of copolymers as in the present invention. However, the present inventors have found that a maleimide-olefin copolymer has positive birefringence, and that this copolymer, when blended with an acrylonitrile-styrene copolymer having a specific acrylonitrile content, gives a composition in which the two copolymers are well compatible with each other and compensate each other for birefringence.

The resin composition of the present invention may contain other polymers and additives, e.g., a stabilizer, an ultraviolet absorber, a processing aid, a flame retardant, and an antistatic agent, as long as it does not act contrary to the spirit of the invention.

The resin composition of the present invention can be molded by known molding techniques such as injection molding, extrusion molding, and injection compression molding. A hard coating may be formed on the thus-obtained moldings, sheets, films, and the like using a silicon, acrylic, or other hard coating agent. An antireflection coating may also be formed.

The composition of the present invention, comprising a maleimide-olefin copolymer and an acrylonitrile-styrene copolymer, is a material having high heat resistance, satisfactory transparency, diminished birefringence, and excellent mechanical properties, in particular high rigidity. The composition is therefore useful in many applications in the electrical and electronic field, automotive field, medical field, food field, etc. The composition of the invention is especially useful as optical parts because it has excellent transparency and diminished birefringence and because the refractive index and dispersion characteristics thereof can be controlled by changing the composition thereof. The composition is also useful as an automotive windowpane material because of its excellent transparency, diminished birefringence, and excellent rigidity and heat resistance.

The present invention will be explained below by reference to Examples, but the invention should not be construed as being limited thereto.

The molecular weight of each polymer yielded was measured with a gel permeation chromatograph (GPC; HLC-802A, manufactured by Tosoh Corp.) and calculated in terms of polystyrene.

The composition of each polymer yielded was determined mainly by elemental analysis and $^1$H-NMR spectrometry.

The glass transition temperature of each composition obtained was measured with a DSC (DSC200, manufactured by Seiko Denshi Kogyo Co., Ltd., Japan) at a temperature rise rate of 10° C./min.

The heat distortion temperature was measured in accordance with ASTM D648 (18.6 kg/cm$^2$).

The flexural strength and the flexural modulus were determined in accordance with ASTM D790.

The yellowness of each composition obtained was evaluated by examining a 0.8 mm-thick pressed sheet in accordance with JIS K5401 by means of a color computer (manufactured by Suga Shikenki K.K., Japan) (reflection method; tristimulus values of the reflector: x=79.44; y=82.22; z=94.51) (the term "JIS" as used herein means "Japanese Industrial Standard").

The refractive index and the Abbe's number were measured with an Abbe's refractometer. The birefringence was measured on an injection-molded sheet (thickness: 1.2 mm) with a single-path birefringence value at an angle of incidence of 30 degrees.

REFERENCE EXAMPLE

Synthesis of Maleimide-Olefin Copolymer:

Into a 30-1 autoclave equipped with a stirrer, a nitrogen-introducing tube, a thermometer, and a evacuation tube were introduced 1.2 kg of N-methylmaleimide, 8 g of t-butyl peroxyneodecanoate, and 15 l of a toluene/methanol mixed solvent (⅓ by weight). After purging with nitrogen several times, 8.5 l of isobutene was introduced into the autoclave to conduct a reaction at 60° C. for 6 hours. The particles thus obtained were centrifuged and then dried. The yield was 1.7 kg.

Results of elemental analysis of the polymer obtained (C=64.7% by weight; H=7.8% by weight; N=8.4% by weight) indicate that the polymer yielded had a maleimide unit content of 50 mol % and an isobutene unit content of 50 mol %. The molecular weight ($M_n$) of the polymer obtained was 95,000.

EXAMPLES 1 AND 2 AND COMPARATIVE EXAMPLES 1 TO 5

The N-methylmaleimide-isobutene copolymer synthesized in Reference Example was mixed by shaking with the same amount of each of acrylonitrile-styrene copolymers having different acrylonitrile contents as shown in Table 1. Each mixture was kneaded with twin-screw extruder Labo Plastomill (manufactured by Toyo Seiki Seisaku-Sho, Ltd., Japan) in a nitrogen atmosphere, and extruded into pellets. The glass transition temperature of each pelleted sample was measured. Also, a 0.8 mm-thick sheet was formed from each sample by hot pressing, and evaluated for transparency. The results obtained are shown in Table 1. When the acrylonitrile-styrene copolymers having an acrylonitrile content in the range of from 21 to 45 mol % were used, compositions each having a single glass transition temperature and excellent transparency were obtained. This indicates that the blended two copolymers were compatible with each other when the acrylonitrile content in the acrylonitrile-styrene copolymer was in that range. In contrast, when the acrylonitrile-styrene copolymers having an acrylonitrile content lower than 21 mol % or higher than 45 mol % were used, the compositions obtained each had two glass transition temperatures and had a milky appearance. This indicates that when the acrylonitrile content was in those ranges, the two copolymers were incompatible with each other. The composition of Comparative Example 5 appeared to be transparent despite the fact that the two copolymers were incompatible with each other. This is because the two copolymers were close to each other in refractive index. The composition of Comparative Example 5 had reduced heat resistance.

TABLE 1

| Example No. | Acrylonitrile Content (% by weight) | Glass Transition Temperature (°C.) | Transparency |
| --- | --- | --- | --- |
| Example 1 | 25 | 117 | transparent |
| Example 2 | 30 | 121 | transparent |
| Comparative Example 1 | 6 | 103, 155 | opaque |
| Comparative Example 2 | 11 | 102, 151 | opaque |
| Comparative Example 3 | 20 | 105, 151 | opaque |
| Comparative Example 4 | 46 | 107, 147 | opaque |
| Comparative Example 5 | 57 | 109, 150 | transparent |

EXAMPLES 3 TO 5 AND COMPARATIVE EXAMPLES 6 AND 7

The N-methylmaleimide-isobutene copolymer synthesized in Reference Example was melt-kneaded together with an acrylonitrile-styrene copolymer (acrylonitrile content: 30 mol %) in each of the proportions shown in Table 2, and pelleted. Each pelleted sample was injection-molded into test pieces, which were then examined for heat distortion temperature, flexural strength, flexural modulus, and yellowness. The results obtained are shown in Table 2. The N-methylmaleimide-isobutene copolymer and the acrylonitrile-styrene copolymer each was evaluated for these properties. The heat distortion temperature of the above-obtained compositions increased with increase in the proportion of the maleimide-olefin copolymer, and the compositions each had a low yellowness and excellent transparency. These results show that the two copolymers were compatible with each other in each composition. The compositions obtained were found to have a satisfactory flexural strength, a high flexural modulus, and excellent mechanical properties. The results of the evaluation of optical properties are shown in Table 3. The refractive index of the moldings obtained decreased with increase in the proportion of the N-methylmaleimide-isobutene copolymer, whereas the Abbe's number increased, i.e., the wavelength dependance of the refractive index decreased, with increase in the proportion of the N-methylmaleimide-isobutene copolymer. The acrylonitrile-styrene copolymer showed the highest birefringence, and the birefringence of the moldings decreased with increase in the proportion of the N-methylmaleimide-isobutene copolymer. The moldings in which the proportions of the N-methylmaleimide-isobutene copolymer to the acrylonitrile-styrene copolymer were 75:25 and 50:50 by weight, respectively, had a lower birefringence than the N-methylmaleimide-isobutene copolymer.

COMPARATIVE EXAMPLE 8

An N-phenylmaleimide-styrene copolymer was used to produce a composition thereof with acrylonitrile. This composition was evaluated for the same properties as in Examples 3 to 5. The results obtained are shown in Table 2. Although there is an improvement in heat resistance, this composition had poor mechanical properties and was unsuitable for practical use. The test pieces obtained had highly yellowed.

COMPARATIVE EXAMPLE 9

A polycarbonate (Panlite, manufactured by Teijin Chemicals Ltd., Japan) was evaluated for the same properties as in Examples 3 to 5. The results obtained are given in Table 3. The results show that the polycarbonate had a larger Abbe's number and therefore a larger wavelength dependence of the refractive index than the resin compositions according to the present invention. Further, the polycarbonate had a far higher birefringence than the resin compositions according to the invention.

TABLE 2

| Example No. | N-Methylmaleimido-isobutene copolymer/-acrylonitrile-styrene copolymer Ratio (by weight) | Heat Distortion Temperature (°C.) | Flexural Strength (kg/cm²) | Flexural Modulus (kg/cm²) | Yellowness |
|---|---|---|---|---|---|
| Example 3 | 75/25 | 122 | 1,320 | 38,000 | 3.4 |
| Example 4 | 50/50 | 115 | 1,360 | 36,000 | 3.3 |
| Example 5 | 25/75 | 101 | 1,340 | 34,000 | 3.1 |
| Comparative Example 6 | 100/0 | 142 | 1,340 | 48,000 | — |
| Comparative Example 7 | 0/100 | 89 | 1,280 | 33,000 | 3.2 |
| Comparative Example 8 | — | 116 | 420 | 32,000 | 48.5 |

TABLE 3

| Example No. | N-Methylmaleimido-isobutene copolymer/-acrylonitrile-styrene copolymer Ratio (by weight) | Reflective Index | Abbe's Number | Birefringence (nm) |
|---|---|---|---|---|
| Example 3 | 75/25 | 1.54 | 46 | 10 |
| Example 4 | 50/50 | 1.55 | 41 | 30 |
| Example 5 | 25/75 | 1.56 | 37 | 70 |
| Comparative Example 6 | 100/0 | 1.53 | 53 | 35 |
| Comparative Exqample 7 | 0/100 | 1.57 | 32 | 90 |
| Comparative Example 9 | — | 1.58 | 29 | 110 |

As apparent from the Examples, the resin composition of the present invention has diminished birefringence, excellent heat resistance, and excellent mechanical properties and is extremely useful in a wide range of applications in, e.g., the automotive field, electrical and electronic field, aviation and shipping field, housing field, medical field, and food field.

While the invention has been described in detail and with reference to specific embodiments thereof, it will be apparent to one skilled in the art that various changes and modifications can be made therein without departing from the spirit and scope thereof.

What is claimed is:

1. A transparent, heat-resistant, rigid resin composition consisting essentially of:

(a) from 1 to 99% by weight of a maleimide-olefin copolymer comprising from 40 to 60 mol % of structural unit (I) shown below and from 60 to 40 mol % of structural unit (II) shown below and having a number-average molecular weight of from $1 \times 10^3$ to $5 \times 10^6$:

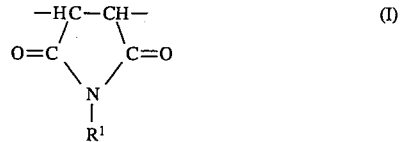

wherein $R^1$ represents a hydrogen atom or an alkyl group having from 1 to 6 carbon atoms,

wherein $R^2$ and $R^3$ each represents a hydrogen atom or an alkyl group having from 1 to 6 carbon atoms; and (b) from 99 to 1% by weight of an acrylonitrile-styrene copolymer having an acrylonitrile content of from 21 to 45% by weight based upon the weight of the acrylonitrile-styrene copolymer.

2. The resin composition of claim 1, wherein said maleimide-olefin copolymer (a) comprises from 45 to 55 mol % of structural unit (I) and from 55 to 45 mol % of structural unit (II).

3. The resin composition of claim 1, wherein said maleimide-olefin copolymer (a) has a number-average molecular weight of from $1 \times 10^4$ to $1 \times 10^6$.

4. The resin composition of claim 1, wherein said maleimide-olefin copolymer (a) is present in an amount of from 10 to 90% by weight and said acrylonitrile-styrene copolymer (b) are present in an amount of from 90 to 10% by weight.

5. The resin composition of claim 1, wherein $R^1$ in said structural unit (I) and $R^2$ and $R^3$ in said structural unit (II) each represents a methyl group.

6. An optical part comprising the resin composition of claim 1.

7. The resin composition of claim 1, wherein (b) has an acrylonitrile content of from 21 to 30% by weight based upon the weight of the acrylonitrile-styrene copolymer.

8. An automotive windowpane material comprising the resin composition of claim 1.

* * * * *